UNITED STATES PATENT OFFICE.

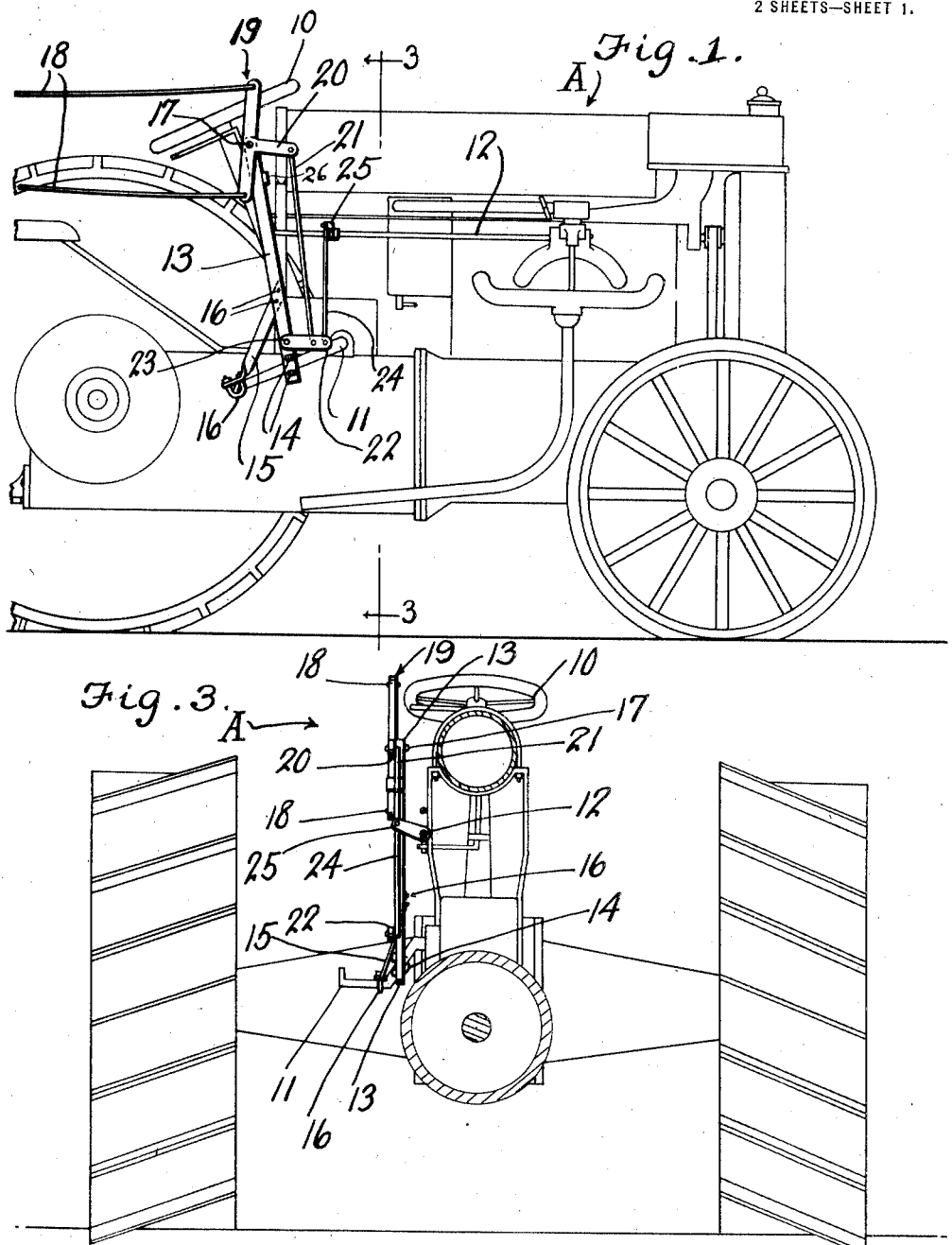

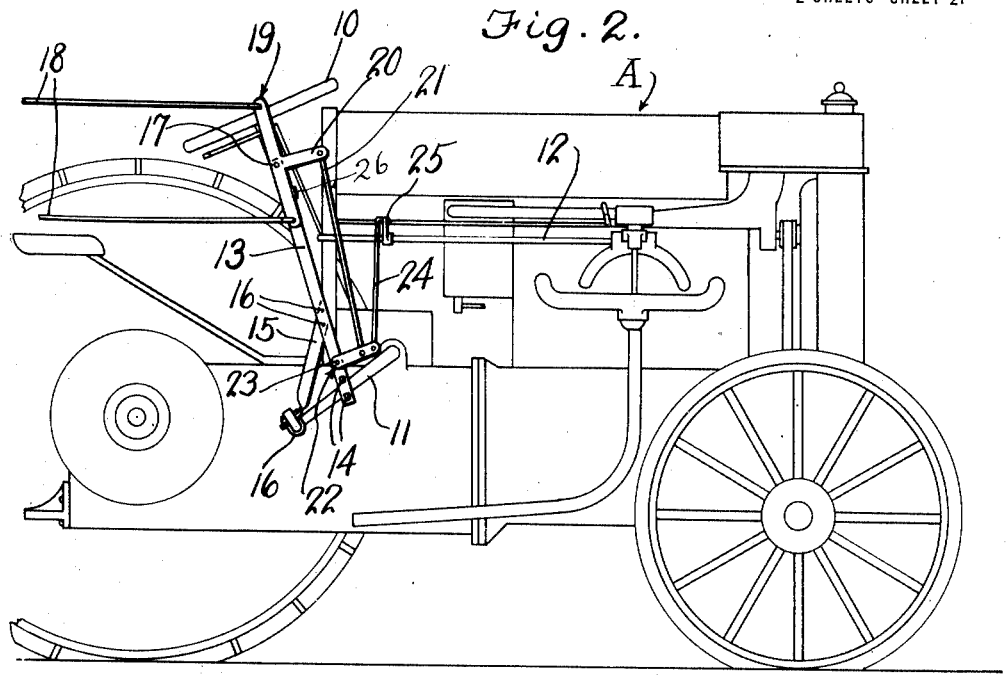
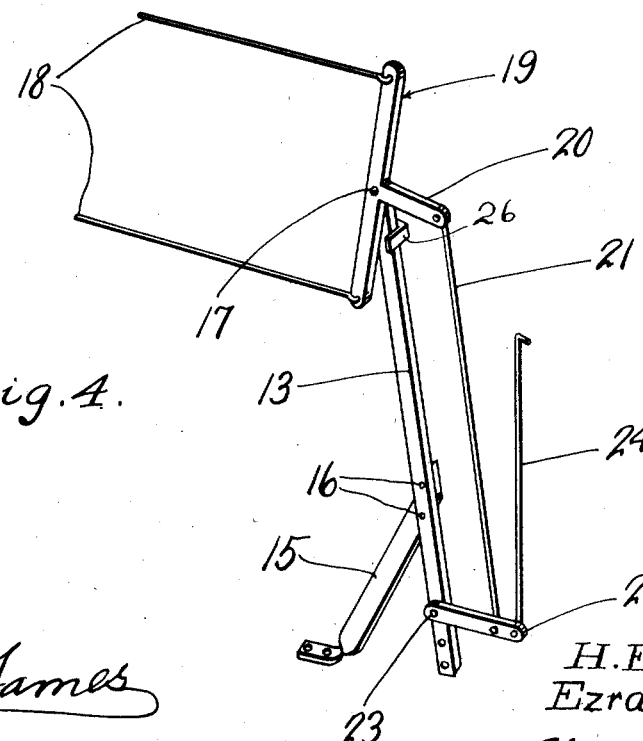

HERBERT E. ABBOTT AND EZRA ENZ, OF OAKVILLE, IOWA.

THROTTLE CONTROL FOR TRACTORS.

1,390,854.   Specification of Letters Patent.   Patented Sept. 13, 1921.

Application filed November 20, 1920. Serial No. 425,423.

*To all whom it may concern:*

Be it known that we, HERBERT E. ABBOTT and EZRA ENZ, citizens of the United States, residing at Oakville, in the county of Louisa and State of Iowa, have invented new and useful Improvements in Throttle Controls for Tractors, of which the following is a specification.

This invention relates to tractors of the Fordson type and has for its primary object the provision of a clutch and throttle control mechanism which may be operated by two ropes at a point removed from the tractor.

The mechanism is controlled by the two ropes above mentioned, and is designed so that the throttle may be adjusted to regulate the speed of the tractor independently of any clutch adjustment, while the clutch may be disengaged subsequent to the closing of the throttle at one and the same movement of the operator.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:

Figure 1 is a side elevation showing the normal position of parts.

Fig. 2 is a similar view showing the adjusted position of the parts when the clutch is disengaged and the throttle closed.

Fig. 3 is a sectional view taken on line 3—3 of Fig. 1.

Fig. 4 is a detail view of the clutch pedal attachment and the operating lever therefor.

Referring to the drawings in detail A indicates generally a tractor of well known construction, wherein 10 indicates the steering wheel, 11 the clutch control pedal, and 12 the throttle control rod.

The mechanism forming the sbject matter of our invention embodies an upright 13 which is fixedly secured to the clutch pedal 11 in any suitable manner, preferably by means of the clamps 14. This upright is further supported in proper position upon the pedal, by means of braces 15, which are riveted or otherwise secured to the plate as at 16, the corresponding terminal of these braces being secured to the pedal 11 as shown. Fulcrumed upon the upright as at 17 is a substantially T-shaped lever through the extremities of which the ropes or cables 18 have their corresponding extremities secured as shown. The ropes or cables control the movements of the T-shaped lever 19, while this lever in turn controls the adjustment of both the clutch and throttle. Terminally secured to the stem 20 of the T-shaped lever is a rod 21 which has its opposite end secured to a lever 22, fulcrumed upon the upright 13 adjacent the lower end thereof, the fulcrum for the latter mentioned lever being indicated at 23. Also connected to the lever 22 is one end of a rod 24, the opposite end of this rod being pivotally associated with the arm 25 which is clamped to the throttle control rod 12 as shown.

In practice, when a pull is exerted upon the rope or cable at the left, a T-shaped lever is swung upon its fulcrum independently of the upright 13, during which movement of the lever the rod 21 is elevated and moves with it the lever 22. Consequently, movement is imparted to the throttle control rod 12 through the instrumentality of the rod 24 and the arm 25 thus partly closes the throttle and slows down the speed of the tractor. The lever 19 moves independently of the upright 13 only until it is brought into contact with the stop 26 projecting from the upright, whereupon by a continued pull upon the cable above mentioned, the lever and upright move rearwardly as a unit. Under these circumstances, the clutch pedal 11 is depressed thus disengaging the clutch, while further movement is imparted to the control rod 12 to completely close the throttle thus stopping the tractor. When one of the cables is released by the operator, the clutch automatically returns to normal position in the usual well known manner, and as the upright 13 is secured to the clutch pedal the parts of the mechanism are also returned to normal position at the same time. When the other cable is pulled upon, the lever 19 is moved upon its fulcrum independently of the upright 13, and operates to open the throttle more or less to increase the speed of the motor, irrespective of whether the clutch is engaged or disengaged.

While it is believed that from the foregoing description, the nature and advantages of the invention will be readily apparent, we desire to have it understood that we do not limit ourselves to the construction herein shown and described and that such changes may be resorted to when desired as fall within the scope of what is claimed.

What we claim is:—

1. A clutch and throttle control mechanism for tractors, comprising an upright secured to the clutch pedal, a lever fulcrumed upon the upright, flexible elements connected to the extremities of said lever, and controlling the movement of the latter, said upright being adjusted to disengage the clutch when said lever reaches a predetermined position, and a connection between said lever and the throttle whereby the latter is controlled independently of the clutch adjustment.

2. A throttle and clutch controlled mechanism for tractors, comprising an upright secured to the clutch pedal, braces terminally secured to the upright and said pedal, a lever fulcrumed upon the upright, flexible elements secured to the extremities of said lever for controlling the movements thereof, a connection between the lever and the throttle control rod, whereby the throttle may be opened and closed upon movement of the lever in an opposite direction and means for limiting the movement of the lever in one direction whereupon said upright is adjusted to disengage the clutch upon a continued pull upon the particular element when moving the lever in this direction.

3. A throttle and clutch control mechanism for tractors comprising an upright secured to the clutch pedal, a substantially T-shaped lever fulcrumed upon said uprights, a flexible element secured to the extremities of said lever for controlling the movements thereof, a connection between the stem of said lever and the throttle controlled rod, whereby the throttle may be opened or closed upon movement of said lever in an opposite direction independently of said upright and means whereby said upright is adjusted to disengage the clutch when the said lever reaches a predetermined position.

4. A throttle and clutch controlled mechanism for tractors, comprising an upright secured to the clutch pedal, a lever fulcrumed upon the upright, a flexible element secured to said lever at the ends thereof, and controlling the movement of the lever, a connection between the lever and the throttle controlled rod, whereby the throttle is opened and closed upon movement of the lever in opposite directions and independently of said uprights, and a stop carried by the upright for limiting the movement of the lever in one direction whereby said upright is adjusted to disengage the clutch as described.

5. A throttle and clutch controlled mechanism for tractors, comprising an upright secured to the clutch controlled pedal, a lever fulcrumed upon the upright, a flexible element secured to the extremities of said lever for controlling the movement thereof, a second lever fulcrumed upon the upright adjacent the lower end thereof, a rod connecting both of said levers, whereby movement is imparted to the second mentioned lever when a pull is exerted on either of said flexible elements and a connection between the second mentioned lever and the throttle control rod, whereby said throttle is opened and closed upon movement of the first mentioned lever in opposite directions, and means whereby the upright is adjusted to effect a release of the clutch when the first mentioned lever reaches a predetermined position.

In testimony whereof we affix our signatures.

HERBERT E. ABBOTT.
EZRA ENZ.